Aug. 6, 1940.   H. S. BERG   2,210,478
LUBRICATOR
Filed Sept. 22, 1936
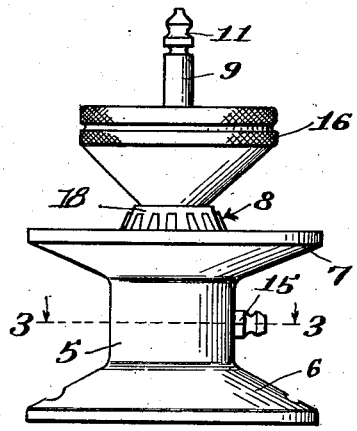
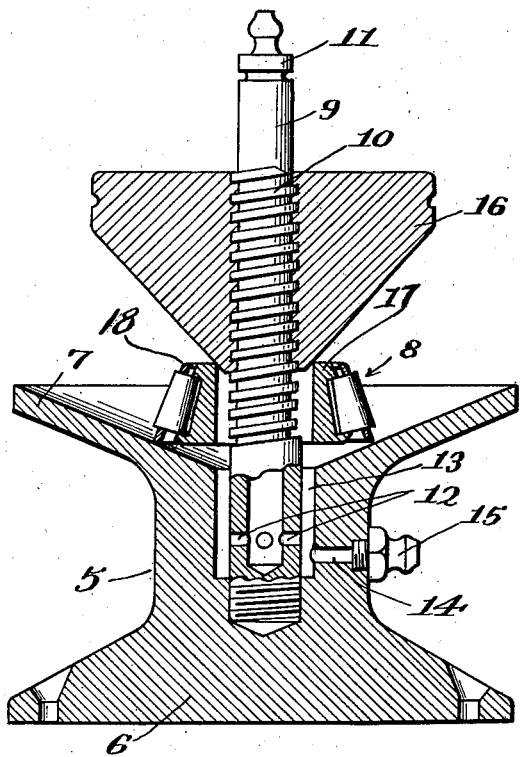
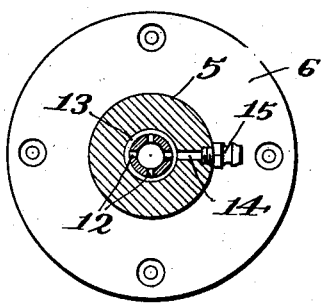
Inventor:
Hans S. Berg.
Attorney.

Patented Aug. 6, 1940

2,210,478

UNITED STATES PATENT OFFICE 2,210,478

LUBRICATOR

Hans S. Berg, Ventura, Calif.

Application September 22, 1936, Serial No. 101,959

6 Claims. (Cl. 184—1)

This invention relates more specifically to a device for expelling or purging worn lubricants, such as greases from roller bearings and the like, and at the same time to replenish the same with a fresh lubricant.

A main object is to provide a device arranged to securely hold in place a roller or ball bearing assembly and to expel the worn grease therefrom and supply by power means new grease thereto from a source of supply unconnected with the device.

Another object is to provide a device having a plurality of lubricant inlet means whereby the device may be mounted in different positions for conveniently utilizing one or the other of said inlets.

Still another object is to provide a lubricating device for roller bearing assemblies which is provided adjacent the lubricant inlet discharging ports with an annular lubricant reservoir, whereby to uniformly distribute the lubricant to the bearing assembly being operated upon.

Other objects and advantages will be apparent from the following description reference being had to the accompanying drawing, in which, Fig. 1 is a side elevation of my lubricating device.

Fig. 2 is a central vertical section through the lubricator.

Fig. 3 is a sectional plan view of the lubricator taken on line 3—3 of Fig. 1.

Briefly, the lubricating device consists of a base member having an annular flange for the reception of a roller or ball bearing assembly. Mounted in the frame and centrally disposed is a lubricant inlet tube threaded externally an having a check valve on its upper end and discharge ports at its lower end. A frusto-conical member is mounted on the inlet tube for clamping the bearing to be operated upon on the bearing receiving flange. An additional lubricant inlet is provided on the base member having a check valve at its outer end and is disposed at substantially right angles to the lubricant inlet tube. The discharge ports of the inlet tube and the inner end of the additional inlet terminating in an annular reservoir formed in the frame and surrounding the lower end of the inlet tube, whereby the lubricant when forced through either of the inlets will be uniformly distributed to the bearing being operated upon.

Referring now more specifically to the drawing, 5 designates a base member preferably formed of a non-corrodible metal, such as cast aluminum, having an attaching base 6 for securing the device in rigid position on a suitable support (not shown). The upper end of the base member terminates in a dished annular flange 7 for the reception of a bearing assembly 8 that is to be lubricated. Centrally mounted in the center of the base member is a vertically disposed lubricant inlet tube 9 externally provided with a coarse threading 10, and at its upper inlet end with a check valve 11 of the "Alemite-Zerk" type, its lower end being provided with a plurality of lubricant discharge ports 12.

Surrounding the lower end of the lubricant inlet tube 9 and formed in the base member is a cylindrical recess 13 forming a lubricant reservoir, the discharge ports 12 opening into the same, the function of said reservoir being more particularly described further on.

Formed in the side wall of the base member is a lubricant inlet bore 14, its outer end being provided with a check valve 15, similar to the valve on the inlet tube, and its inner end discharging into the reservoir 13.

Threadingly engaging the inlet tube 9 is a frusto-conical bearing holding member 16, the coarsely threaded tube permitting of a rapid movement of the holding member on the inlet tube.

The operation of the device will be clearly apparent from the following. When a bearing assembly is to be operated upon the frusto-conical holding member 16 is first moved from the inlet tube 9, and the bearing assembly mounted on the dished flange of the base member, the dished surface of the flange readily adapting itself to bearing assemblies of different sizes. The holding member is then replaced on the inlet tube and screwed down upon the inner ring 17 bearing assembly, the lower end entering the opening of said ring 17 and sealing the same against the escape of lubricant therethrough during a lubrication operation, and at the same time firmly holding the bearing in position on the receiving flange. One or the other of the lubricant inlets is then connected to a lubricant power apparatus, of usual type, or an ordinary grease gun, the lubricant after completely filling the reservoir 13 will on further pressure distribute the lubricant evenly and uniformly between the inner and the outer rings 17 and 18 of the bearing assembly, at the same time purging the bearing of its worn lubricant, the surplus lubricant being readily removed from the annular flange after a lubrication.

By providing two lubricant inlets it will be possible to use either one that is most convenient, according to the position in which the device is mounted on its support.

Further as I have illustrated and described my lubricating device as having two lubricant inlet openings leading to a bearing assembly being lubricated, it will be perfectly obvious that one of said inlets may be dispensed with if desired, the single lubricant inlet functioning efficiently.

I claim:

1. A bearing member lubricating device comprising a base member having a dished seating flange for one end of a bearing assembly, said base member having an annular lubricant reservoir leading to the bearing, an externally threaded lubricant inlet tube having a valved upper end mounted in said base member, said tube having lubricant discharge ports in its lower end opening into said reservoir and means mounted on said inlet and engaging the other end of the bearing assembly for clamping said bearing in place on said seating flange.

2. A lubricating device for bearing assemblies comprising a body member having an annular dished flange at its upper end and a lubricant reservoir, a tubular externally threaded lubricant inlet tube mounted on said body member, an inlet nipple on the upper end of said inlet tube, the lower end of said tube having a lubricant discharge port leading to the reservoir of said body member, and a closure member rotatably mounted on said tube for clamping the bearing on the dished flange and sealing its central opening.

3. A lubricating device for bearings comprising a body member having an annular dished flange at its upper end, said body member provided with a centrally disposed annular lubricant reservoir opening into said flange, a tubular externally threaded lubricant inlet tube secured to said body member having an inlet nipple at its upper end, the lower end of said tube having a lubricant discharge port opening into said reservoir, and a bearing holding member rotatably mounted on said tube, said bearing member clamping the bearing in place on said dished flange and sealing its central opening against the escape of lubricant therethrough.

4. A lubricating device for bearings comprising a base member having an annular flange for the reception of a bearing assembly, a hollow externally threaded lubricant inlet tube secured to said base member, said tube having an inlet nipple at its upper end and a lubricant discharge port at its lower end leading to said bearing, and a frusto-conical seating member for one end of the bearing mounted on the threaded lubricant inlet tube for clamping the bearing on the dished flange.

5. A lubricating device for roller bearing assemblies comprising a base member having a bearing seating flange at its upper end, a hollow externally threaded lubricant inlet tube secured to said base member, said tube having an inlet nipple at its upper end and a lubricant discharge port at its lower end, said base member being provided with a lubricant recess leading to the bearing, the port in said tube discharging into said recess, and a seating member disposed on said tube for sealing the central opening in the bearing assembly and clamping the same in engagement with the seating flange.

6. A lubricant device for bearing assemblies comprising a base member including a dished bearing support and a centrally disposed circular recess, a centrally and vertically disposed externally threaded hollow shaft mounted in the circular recess of said base member, the diameter of said shaft being less than the diameter of said recess, the upper end of said recess opening into said dished bearing support, the lower end of said shaft being provided with lubricant discharge ports opening into said recess, the upper end of said shaft having a lubricant inlet nipple for introducing the lubricant under pressure into the recess and thence to the bearing, and a conical nut mounted on said shaft for engaging the upper end of a bearing assembly to hold the same on the bearing support during a lubricating operation and to seal its central opening against discharge of lubricant therethrough.

H. S. BERG.